(12) United States Patent
Gao et al.

(10) Patent No.: US 10,644,767 B2
(45) Date of Patent: May 5, 2020

(54) CHANNEL STATE INFORMATION TRANSMISSION METHOD AND DEVICE FOR DETERMINING A PRE-CODING MATRIX FOR DOWNLINK TRANSMISSION

(71) Applicant: China Academy of Telecommunications Technology, Beijing (CN)

(72) Inventors: Qiubin Gao, Beijing (CN); Runhua Chen, Beijing (CN); Tamrakar Rakesh, Beijing (CN); Hui Li, Beijing (CN); Qiuping Huang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/337,841

(22) PCT Filed: Jul. 12, 2017

(86) PCT No.: PCT/CN2017/092647
§ 371 (c)(1),
(2) Date: Mar. 28, 2019

(87) PCT Pub. No.: WO2018/059072
PCT Pub. Date: Apr. 5, 2018

(65) Prior Publication Data
US 2019/0341979 A1    Nov. 7, 2019

(30) Foreign Application Priority Data

Sep. 29, 2016 (CN) .......................... 2016 1 0867803

(51) Int. Cl.
*H04B 7/0456*  (2017.01)
*H04B 7/06*  (2006.01)
(Continued)

(52) U.S. Cl.
CPC ......... *H04B 7/0456* (2013.01); *H04B 7/0626* (2013.01); *H04B 7/0634* (2013.01);
(Continued)

(58) Field of Classification Search
CPC .. H04B 7/0456; H04B 7/0626; H04B 7/0634; H04B 7/0452; H04B 7/06; H04B 7/0413;
(Continued)

(56) References Cited

U.S. PATENT DOCUMENTS

| 7,961,807 B2 | 6/2011 | Kotecha et al. |
| 2004/0178954 A1* | 9/2004 | Vook .................... H04B 7/0617 342/383 |

(Continued)

FOREIGN PATENT DOCUMENTS

| CN | 101018084 A | 8/2007 |
| CN | 101286824 A | 10/2008 |

(Continued)

OTHER PUBLICATIONS

Huawei, "Performance evaluation of adaptive codebook as enhancement of 4 Tx feedback," 3GPP TSG RAN WG1#6Ibis, RI-103447, Dresden, Germany 28th, Jun. 28-Jul. 2, 2010.
(Continued)

*Primary Examiner* — Tejis Daya
(74) *Attorney, Agent, or Firm* — Foley & Lardner LLP

(57) ABSTRACT

Disclosed in the present invention are a method and a device for transmitting channel state information, for solving the problem that due to the limitation of a codebook structure, the prior art can only provide channel state information with limited precision and it is not suitable for a base station to use a transmission scheme of an advanced preprocessing algorithm. The method comprises: a terminal determining a basis matrix according to a candidate wave beam vector set, the basis matrix being a matrix formed by N wave beam (Continued)

S51
A UE determines a basis matrix according to a candidate beam vector set, where the basis matrix is a matrix of N beam vectors in the candidate beam vector set, and N is a positive integer S52
The UE determines a combination coefficient matrix according to the basis matrix and channel state parameters S53
The UE feeds the identifier of the basis matrix, and the combination coefficient matrix back to the base station vectors from the candidate wave beam vector set, the N being a positive integer; the terminal determining a combined coefficient matrix according to the basis matrix and a channel state parameter; the terminal feeding back the identification information of the basis matrix and the combined coefficient matrix to a base station. The invention effectively improves the precision of channel state information feedback, and improves the performance of multi-antenna transmission, especially multiple user-multiple input multiple output (MU-MIMO) transmission.

20 Claims, 4 Drawing Sheets

(51) Int. Cl.
H04L 1/00 (2006.01)
H04W 88/06 (2009.01)
H04B 7/0452 (2017.01)

(52) U.S. Cl.
CPC ........... H04L 1/0029 (2013.01); H04W 88/06 (2013.01); H04B 7/0452 (2013.01)

(58) Field of Classification Search
CPC ... H04B 7/0632; H04B 7/0617; H04W 88/06; H04W 88/02; H04L 1/0029; H04L 5/00; H04L 1/00; H04L 5/0057; H04L 5/0053; H04L 1/0026
See application file for complete search history.

(56) References Cited

U.S. PATENT DOCUMENTS

| | | | | |
|---|---|---|---|---|
| 2009/0016463 A1* | 1/2009 | Roh | ............ | H04B 7/0417 375/295 |
| 2009/0207077 A1* | 8/2009 | Hwang | ............ | H01Q 3/40 342/374 |
| 2011/0122961 A1* | 5/2011 | Sang | ............ | H04B 7/0434 375/267 |
| 2011/0319092 A1* | 12/2011 | Kim | ............ | H04B 7/024 455/452.1 |
| 2012/0218948 A1 | 8/2012 | Onggosanusi et al. | | |
| 2013/0064129 A1* | 3/2013 | Koivisto | ............ | H04B 7/0621 370/252 |
| 2013/0083758 A1* | 4/2013 | Kim | ............ | H04L 25/00 370/329 |
| 2014/0177745 A1 | 1/2014 | Krishnamurthy | | |
| 2014/0177751 A1* | 6/2014 | Tomeba | ............ | H04B 7/0456 375/295 |
| 2014/0313976 A1* | 10/2014 | Tian | ............ | H04B 7/0626 370/328 |
| 2015/0061922 A1* | 3/2015 | Kishigami | ............ | G01S 7/2813 342/147 |
| 2015/0189568 A1* | 7/2015 | Stanze | ............ | H04W 16/28 370/331 |
| 2015/0289155 A1* | 10/2015 | Gao | ............ | H04L 5/0057 370/252 |
| 2016/0072563 A1* | 3/2016 | Lee | ............ | H04B 7/0421 375/267 |
| 2016/0072570 A1* | 3/2016 | Kimura | ............ | H04B 7/0617 370/329 |
| 2016/0142117 A1* | 5/2016 | Rahman | ............ | H04B 7/0469 375/267 |

FOREIGN PATENT DOCUMENTS

| | | |
|---|---|---|
| CN | 102970103 A | 3/2013 |
| CN | 103178888 A | 6/2013 |
| CN | 104202276 A | 12/2014 |
| CN | 104243003 A | 12/2014 |
| CN | 105071845 A | 11/2015 |
| CN | 105450273 A | 3/2016 |
| CN | 105721030 A | 6/2016 |
| CN | 105933046 A | 9/2016 |
| WO | WO-2011/050756 A1 | 5/2011 |

OTHER PUBLICATIONS

Catt,Discussion on advanced CSI reporting and interference measurement enhancement 3GPP TSG-RAN WG1#86 R1-166448,Gothenburg, Sweden, Aug. 22-26, 2016.
Huawei,Feedback of Long Term Channel Information for Adaptive Codebook,3GPP TSG-RAN WG1#60 R1-101062, San Francisco, USA, Feb. 22-26, 2010.
ITRI,Discussion of CSI reporting based on beamformed CSI-RS,3GPP TSG-RAN WG1#81 R1-152943, Fukuoka, Japan, May 25-29, 2015.
Nokia, Alcatel-Lucent Shanghai Bell,On procedures for beam selection and feedback signaling,3GPP TSG-RAN WG1#86 R1-167287,Gothenburg, Sweden, Aug. 22-26, 2016.

* cited by examiner

CHANNEL STATE INFORMATION TRANSMISSION METHOD AND DEVICE FOR DETERMINING A PRE-CODING MATRIX FOR DOWNLINK TRANSMISSION

This application is a US National Stage of International Application No. PCT/CN2017/092647, filed Jul. 12, 2017, which claims priority to Chinese Patent Application No. 201610867803.6, filed with the Chinese Patent Office on Sep. 29, 2016, and entitled "Method and device for transmitting channel state information", which is hereby incorporated by reference in its entirety.

FIELD

The present invention relates to the field of communications, and particularly to a method and device for transmitting channel state information.

BACKGROUND

The technologies of closed-loop pre-coding have been introduced to the Long Term Evolution (LTE) Release 8 (Rel-8) system to improve the spectrum frequency. The same set of pre-coding matrixes, which is referred to as a codebook, shall be stored in both a base station and a UE as required for the technologies of closed-loop pre-coding. The UE selects a pre-coding matrix from the codebook under some criterion after estimating channel information according to a cell common pilot, where the selected criterion can be the maximized amount of exchanged information, the maximized output signal to interference plus noise ratio, etc.; the UE feeds the index of the selected pre-coding matrix in the codebook back to the base station on an uplink channel, where the index is referred to as a Pre-coding Matrix Indicator (PMI); and the base station can determine the pre-coding matrix to be applied to the UE, according to the received index. The pre-coding matrix reported by the UE can be regarded as a quantized value of channel state information.

In the existing cellular system, an array of antennas in the base station is typically arranged horizontally (i.e., a linear array) as illustrated in FIG. 1 and FIG. 2. A beam of a transmitter in the base station can only be adjusted in the horizontal direction, and there is a fixed downward inclination angle of each UE in the vertical direction, so the various beam-forming/pre-coding technologies are applicable to channel information in the horizontal direction. In fact, a radio signal is propagated in three dimensions in a space, and the performance of the system cannot be optimized with a fixed downward inclination angle, so beam adjustment in the vertical direction is of great significance to an improvement in performance of the system. With the development of the antenna technologies, an array of active antennas in which respective array elements are controllable separately has emerged in the industry, for example, in a two-dimension arrangement of dual polarized antennas as illustrated in FIG. 3, and a two-dimension arrangement of liner array antennas as illustrated in FIG. 4. With such two-dimension antenna array (a planar array), it is possible to adjust a beam dynamically in the vertical direction. The base station also needs to perform beam-forming/pre-coding in three dimensions using channel state information reported by the UE. The LTE Rel-13 extends the codebook applied to a linear array to obtain a codebook of a planar array, so that the UE can feedback channel state information.

In the 3GPP LTE/LTE-A and IEEE 802.16 series of standards, various codebooks are designed for different numbers of antennas, antenna modalities, application scenarios, etc., but due to the limiting of the codebook structure, there is such limited precision of channel state information which can be provided in these codebook-based feedback schemes that the channel state information may not be applicable to a transmission scheme using a sophisticated preprocessing algorithm, e.g., Multi-User Multi-Input Multi-Output (MU-MIMO) transmission, at the base station side.

SUMMARY

Embodiments of the invention provide a method and device for transmitting channel state information so as to address the problem in the prior art: due to the limiting of codebook structure, there is such limited precision of channel state information which can be provided in these codebook-based feedback schemes, that the channel state information may not be applicable to a transmission scheme using a sophisticated preprocessing algorithm at the base station side.

In a first aspect, there is provided a method for transmitting channel state information, the method including:

determining, by a UE, a basis matrix according to a candidate beam vector set, wherein the basis matrix is a matrix of N beam vectors in the candidate beam vector set, and N is a positive integer;

determining, by the UE, a combination coefficient matrix according to the basis matrix and a channel state parameter; and feeding, by the UE, an identifier of the basis matrix, and the combination coefficient matrix back to a base station.

In a possible implementation, the candidate beam vector set is prescribed, or is determined by the base station and then notified to the UE.

In a possible implementation, the value of N is prescribed, or is determined by the base station and then notified to the UE, or is determined by the UE according to a channel condition between the UE and the base station.

In a possible implementation, determining, by the UE, the basis matrix according to the candidate beam vector set includes:

selecting, by the UE, first N beam vectors from the candidate beam vector set in a descending order of their metrics, and determining a matrix of the selected N beam vectors as the basis matrix; or selecting, by the UE, one of L beam vector groups, wherein the L beam vector groups are obtained by grouping beam vectors in the candidate beam vector set, and L is a positive integer; and selecting N beam vectors from the selected beam vector group, and determining a matrix of the selected N beam vectors as the basis matrix; or selecting, by the UE, T beam vectors from the candidate beam vector set, wherein T is more than N; and selecting N beam vectors from the T beam vectors, and determining a matrix of the selected N beam vectors as the basis matrix.

In a possible implementation, selecting, by the UE, one of L beam vector groups includes: selecting, by the UE, a beam vector group including the beam vector with the largest metric from the L beam vector groups; or determining, by the UE, a metric corresponding to each beam vector group, and selecting the beam vector group with the largest metric, wherein the metric corresponding to each beam vector group is a value obtained by performing a preset operation on metrics of the beam vectors in the beam vector group.

In a possible implementation, any two of the N beam vectors are orthogonal to each other; and/or any two beam vectors in each beam vector group are orthogonal to each other.

In a possible implementation, feeding, by the UE, the identifier of the basis matrix back to the base station includes: feeding, by the UE, the identifiers of the N beam vectors in the candidate beam vector set back to the base station; or feeding, by the UE, joint encoded information of identifiers of a part or all of the N beam vectors back to the base station; or feeding, by the UE, the identifier of the beam vector with the largest metric among the N beam vectors, in the candidate beam vector set, and the identifiers of the other N−1 beam vectors in a set of all the beam vectors orthogonal to the beam vector with the largest metric in the candidate beam vector set back to the base station.

Furthermore feeding, by the UE, the joint encoded information of identifiers of a part or all of the N beam vectors back to the base station includes: feeding, by the UE, joint encoded information of identifiers of the N beam vectors in the candidate beam vector set back to the base station; or feeding, by the UE, the identifier of the beam vector with the largest metric among the N beam vectors, in the candidate beam vector set, and joint encoded information of identifiers of the other N−1 beam vectors in the candidate beam vector set back to the base station; or feeding, by the UE, the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set back to the base station.

In a possible implementation, when the UE selects one of the L beam vector groups, and selects N beam vectors from the selected beam vector group, feeding, by the UE, the identifier of the basis matrix back to the base station includes: feeding, by the UE, the identifier of the selected beam vector group, and the identifiers of the N beam vectors in the selected beam vector group back to the base station.

In a possible implementation, when the UE selects T beam vectors from the candidate beam vector set, and selects N beam vectors from the T beam vectors, feeding, by the UE, the identifier of the basis matrix back to the base station includes: feeding, by the UE, the identifiers of the T beam vectors back to the base station as first-level identification information, and feeding, by the UE, the identifiers of the N beam vectors in the T beam vectors back to the base station as second-level identification information.

In a possible implementation, the first-level identification information and the second-level identification information is fed back at different instances of time; or the first-level identification information and the second-level identification information is fed back at the same instance of time for different bandwidths; or the first-level identification information and the second-level identification information is fed back at different instances of time for different bandwidths.

In a possible implementation, the method further includes: feeding, by the UE, the identifier, of the beam vector with the largest metric among the N beam vectors, in the N beam vectors back to the base station.

In a possible implementation, after the UE determines the combination coefficient matrix according to the basis matrix and the channel state parameter, the method further includes: determining, by the UE, a pre-coding matrix according to the basis matrix and the combination coefficient matrix; determining, by the UE, a Channel Quality Indicator (CQI) according to the pre-coding matrix; and feeding, by the UE, the CQI back to the base station.

In a second aspect, there is provided a method for receiving channel state information, the method including:
receiving, by a base station, an identifier of a basis matrix, and a combination coefficient matrix, fed back by a UE;
determining, by the base station, N beam vectors from a candidate beam vector set according to the identifier of the basis matrix, the N beam vectors constituting the basis matrix, and N being a positive integer; and determining, by the base station, a pre-coding matrix for downlink transmission with the UE according to the basis matrix and the combination coefficient matrix.

In a possible implementation, the candidate beam vector set is prescribed, or is determined by the base station and then notified to the UE.

In a possible implementation, the value of N is prescribed, or is determined by the base station and then notified to the UE, or is determined by the UE as a result of channel measurement between the UE and the base station, and fed back to the base station.

In a possible implementation, receiving, by the base station, the identifier of the basis matrix fed back by the UE includes: receiving, by the base station, the identifiers of the N beam vectors in the candidate beam vector set, which are fed back by the UE; or receiving, by the base station, joint encoded information of identifiers of a part or all of the N beam vectors, which are fed back by the UE; or receiving, by the base station, the identifier of a beam vector group selected by the UE, and the identifiers of the N beam vectors in the selected beam vector group, which are fed back by the UE, wherein the beam vector group is consisted of a part of beam vectors in the candidate beam vector set; or receiving, by the base station, the identifier, of the beam vector with the largest metric among the N beam vectors, in the candidate beam vector set, and the identifiers of the other N−1 beam vectors in a set of all the beam vectors orthogonal to the beam vector with the largest metric in the candidate beam vector set, which are fed back by the UE; or receiving, by the base station, first-level identification information and second-level identification information fed back by the UE, wherein the first-level identification information is the identifiers, of T beam vectors selected by the UE from the candidate beam vector set, in the candidate beam vector set, and the second-level identification information is the identifiers of the N beam vectors in the T beam vectors.

In a possible implementation, receiving, by the base station, the joint encoded information of identifiers of a part or all of the N beam vectors, which are fed back by the UE includes: receiving, by the base station, joint encoded information of identifiers of the N beam vectors in the candidate beam vector set, which are fed back by the UE; or receiving, by the base station, the identifier of the beam vector with the largest metric among the N beam vectors, in the candidate beam vector set, and joint encoded information of the identifiers of the other N−1 beam vectors in the candidate beam vector set, which are fed back by the UE; or receiving, by the base station, the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set, which are fed back by the UE.

In a possible implementation, the first-level identification information and the second-level identification information is fed back at different instances of time; or the first-level identification information and the second-level identification information is fed back at the same instance of time for different bandwidths; or the first-level identification information and the second-level identification information is fed back at different instances of time for different bandwidths.

In a possible implementation, the method further includes: receiving, by the base station, the identifier, of the beam vector with the largest metric among the N beam vectors, in the N beam vectors, which is fed back by the UE.

In a third aspect, there is provided a computer readable storage medium storing executable program codes configured to perform the method according to the first aspect.

In a fourth aspect, there is provided a computer readable storage medium storing executable program codes configured to perform the method according to the second aspect.

In a fifth aspect, there is provided a UE including:

a basis matrix determining module configured to determine a basis matrix according to a candidate beam vector set, wherein the basis matrix is a matrix of N beam vectors in the candidate beam vector set, and N is a positive integer;

a combination coefficient determining module configured to determine a combination coefficient matrix according to the basis matrix and a channel state parameter; and a feedback module configured to feed the identifier of the basis matrix, and the combination coefficient matrix back to a base station.

In a possible implementation, the basis matrix determining module is configured: to select first N beam vectors from the candidate beam vector set in a descending order of their metrics, and to determine a matrix of the selected N beam vectors as the basis matrix; or to select one of L beam vector groups, wherein the L beam vector groups are obtained by grouping the beam vectors in the candidate beam vector set, and L is a positive integer; and to select N beam vectors from the selected beam vector group, and to determine a matrix of the selected N beam vectors as the basis matrix; or to select T beam vectors from the candidate beam vector set, wherein T is more than N; and to select N beam vectors from the T beam vectors, and to determine a matrix of the selected N beam vectors as the basis matrix.

Furthermore the basis matrix determining module is configured: to select a beam vector group including the beam vector with the largest metric from the L beam vector groups; or to determine a metric corresponding to each beam vector group, and to select the beam vector group with the largest metric, wherein the metric corresponding to each beam vector group is a value obtained by performing a preset operation on metrics of beam vectors in the beam vector group.

In a possible implementation, the feedback module is configured: to feed the identifiers of the N beam vectors in the candidate beam vector set back to the base station; or to feed joint encoded information of identifiers of a part or all of the N beam vectors back to the base station; or to feed the identifier of the beam vector with the largest metric among the N beam vectors, in the candidate beam vector set, and the identifiers of the other N−1 beam vectors in a set of all the beam vectors orthogonal to the beam vector with the largest metric in the candidate beam vector set back to the base station.

Furthermore the feedback module is configured: to feed joint encoded information of identifiers of the N beam vectors in the candidate beam vector set back to the base station; or to feed the identifier of the beam vector with the largest metric among the N beam vectors, in the candidate beam vector set, and joint encoded information of the identifiers of the other N−1 beam vectors in the candidate beam vector set back to the base station; or to feed the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set back to the base station.

In a possible implementation, the feedback module is configured: to feed the identifier of the selected beam vector group, and the identifiers of the N beam vectors in the selected beam vector group back to the base station.

In a possible implementation, the feedback module is configured: to feed the identifiers of the T beam vectors back to the base station as first-level identification information, and to feed the identifiers of the N beam vectors in the T beam vectors back to the base station as second-level identification information.

In a possible implementation, the feedback module is further configured: to feed the identifier, of the beam vector with the largest metric among the N beam vectors, in the N beam vectors back to the base station.

In a possible implementation, the UE further includes:

a CQI determining module configured to determine a pre-coding matrix according to the basis matrix and the combination coefficient matrix, and to determine a CQI according to the pre-coding matrix; and the feedback module is further configured to feed the CQI back to the base station.

In a sixth aspect, there is provided a base station including:

a receiving module configured to receive an identifier of a basis matrix, and a combination coefficient matrix, fed back by a UE;

a first determining module configured to determine N beam vectors in the basis matrix from a candidate beam vector set according to the identifier of the basis matrix, wherein the N beam vectors constitute the basis matrix, and N is a positive integer; and a second determining module configured to determine a pre-coding matrix for downlink transmission with the UE according to the basis matrix and the combination coefficient matrix.

In a possible implementation, the receiving module is configured: to receive the identifiers of the N beam vectors in the candidate beam vector set, which are fed back by the UE; or to receive joint encoded information of identifiers of a part or all of the N beam vectors, which are fed back by the UE; or to receive the identifier of a beam vector group selected by the UE, and the identifiers of the N beam vectors in the selected beam vector group, which are fed back by the UE, wherein the beam vector group is consisted of a part of beam vectors in the candidate beam vector set; or to receive the identifier, of the beam vector with the largest metric among the N beam vectors, in the candidate beam vector set, and the identifiers of the other N−1 beam vectors in a set of all the beam vectors orthogonal to the beam vector with the largest metric in the candidate beam vector set, which are fed back by the UE; or to receive first-level identification information and second-level identification information fed back by the UE, wherein the first-level identification information is the identifiers, of T beam vectors selected by the UE from the candidate beam vector set, in the candidate beam vector set, and the second-level identification information are the identifiers of the N beam vectors in the T beam vectors.

Furthermore the receiving module is configured: to receive joint encoded information of identifiers of the N beam vectors in the candidate beam vector set, which are fed back by the UE; or to receive the identifier of the beam vector with the largest metric among the N beam vectors, in the candidate beam vector set, and joint encoded information of the identifiers of the other N−1 beam vectors in the candidate beam vector set, which are fed back by the UE; or to receive the identifier of the beam vector with the largest metric among the N beam vectors, in the candidate beam vector set, and joint encoded information of the other N−1 beam vectors in a set of all the beam vectors orthogonal to the beam vector with the largest metric in the candidate beam vector set, which are fed back by the UE.

In a possible implementation, the receiving module is further configured: to receive the identifier, of the beam vector with the largest metric among the N beam vectors, in the N beam vectors, which is fed back by the UE.

In a seventh aspect, there is provided a UE including a transceiver, and at least one processor connected with the transceiver, wherein the processor is configured to read and execute program in a memory: to determine a basis matrix according to a candidate beam vector set, wherein the basis matrix is a matrix of N beam vectors in the candidate beam vector set, and N is a positive integer; to determine a combination coefficient matrix according to the basis matrix and a channel state parameter; and to control the transceiver to feed the identifier of the basis matrix, and the combination coefficient matrix back to a base station; and the transceiver is configured to receive and transmit data under the control of the processor.

In a possible implementation, the processor is configured to read and execute the program in the memory: to select the first N beam vectors from the candidate beam vector set in a descending order of their metrics, and to determine a matrix of the selected N beam vectors as the basis matrix; or to select one of L beam vector groups, wherein the L beam vector groups are obtained by grouping beam vectors in the candidate beam vector set, and L is a positive integer; and to select N beam vectors from the selected beam vector group, and to determine a matrix of the selected N beam vectors as the basis matrix; or to select T beam vectors from the candidate beam vector set, wherein T is more than N; and to select N beam vectors from the T beam vectors, and to determine a matrix of the selected N beam vectors as the basis matrix.

Furthermore the processor is configured to read and execute the program in the memory: to select a beam vector group including the beam vector with the largest metric from the L beam vector groups; or to determine a metric corresponding to each beam vector group, and to select the beam vector group with the largest metric, wherein the metric corresponding to each beam vector group is a value obtained by performing a preset operation on metrics of the beam vectors in the beam vector group.

In a possible implementation, the processor is configured to read and execute the program in the memory: to feed the identifiers of the N beam vectors in the candidate beam vector set back to the base station through the transceiver; or to feed joint encoded information of identifiers of a part or all of the N beam vectors back to the base station through the transceiver; or to feed the identifier of the beam vector with the largest metric among the N beam vectors, in the candidate beam vector set, and the identifiers of the other N−1 beam vectors in a set of all the beam vectors orthogonal to the beam vector with the largest metric in the candidate beam vector set back to the base station through the transceiver.

Furthermore the processor is configured to read and execute the program in the memory: to feed joint encoded information of identifiers of the N beam vectors in the candidate beam vector set back to the base station through the transceiver; or to feed the identifier of the beam vector with the largest metric among the N beam vectors, in the candidate beam vector set, and joint encoded information of the identifiers of the other N−1 beam vectors in the candidate beam vector set back to the base station through the transceiver; or to feed the identifier the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set back to the base station through the transceiver.

In a possible implementation, the processor is configured to read and execute the program in the memory: to feed the identifier of the selected beam vector group, and the identifiers of the N beam vectors in the selected beam vector group back to the base station through the transceiver.

In a possible implementation, the processor is configured to read and execute the program in the memory: to feed the identifiers of the T beam vectors back to the base station through the transceiver as first-level identification information, and to feed the identifiers of the N beam vectors in the T beam vectors back to the base station through the transceiver as second-level identification information.

In a possible implementation, the processor is configured to read and execute the program in the memory: to feed the identifier, of the beam vector with the largest metric among the N beam vectors, in the N beam vectors back to the base station through the transceiver.

In a possible implementation, the processor is further configured to read and execute the program in the memory: to determine a pre-coding matrix according to the basis matrix and the combination coefficient matrix, and to determine a CQI according to the pre-coding matrix; and to feed the CQI back to the base station through the transceiver.

In an eighth aspect, there is provided a base station including a transceiver, and at least one processor connected with the transceiver, wherein the processor is configured to read and execute program in a memory: to receive an identifier of a basis matrix, and a combination coefficient matrix, fed back by a UE through the transceiver; to determine N beam vectors in the basis matrix from a candidate beam vector set according to the identifier of the basis matrix, wherein the N beam vectors constitute the basis matrix, and N is a positive integer; and to determine a pre-coding matrix for downlink transmission with the UE according to the basis matrix and the combination coefficient matrix; and the transceiver is configured to receive and transmit data under the control of the processor.

In a possible implementation, the processor is configured to read and execute the program in the memory: to receive the identifiers of the N beam vectors in the candidate beam vector set, which are fed back by the UE through the transceiver; or to receive joint encoded information of identifiers of a part or all of the N beam vectors, which are fed back by the UE through the transceiver; or to receive the identifier of a beam vector group selected by the UE, and the identifiers of the N beam vectors in the selected beam vector group, which are fed back by the UE through the transceiver, wherein the beam vector group is consisted of a part of beam vectors in the candidate beam vector set; or to receive the identifier, of the beam vector with the largest metric among the N beam vectors, in the candidate beam vector set, and the identifiers of the other N−1 beam vectors in a set of all the beam vectors orthogonal to the beam vector with the largest metric in the candidate beam vector set, which are fed back by the UE through the transceiver; or to receive first-level identification information and second-level identification information fed back by the UE through the transceiver, wherein the first-level identification information is the identifiers, of T beam vectors selected by the UE from the candidate beam vector set, in the candidate beam vector set, and the second-level identification information is the identifiers of the N beam vectors in the T beam vectors.

Furthermore the processor is configured to read and execute the program in the memory: to receive joint encoded information of identifiers of the N beam vectors in the candidate beam vector set, which are fed back by the UE through the transceiver; or to receive the identifier of the beam vector with the largest metric among the N beam vectors, in the candidate beam vector set, and joint encoded information of the identifiers of the other N−1 beam vectors in the candidate beam vector set, which are fed back by the UE through the transceiver; or to receive the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set, which are fed back by the UE through the transceiver.

In a possible implementation, the processor is further configured to read and execute the program in the memory: to receive the identifier, of the beam vector with the largest metric among the N beam vectors, among the N beam vectors, which is fed back by the UE through the transceiver.

In the method and device according to the embodiments of the invention, the UE determines the basis matrix according to the candidate beam vector set; and the UE determines the combination coefficient matrix according to the basis matrix and the channel state parameter, and feeds the identifier of the basis matrix, and the combination coefficient matrix back to the base station. The channel state parameter can be fed back at higher precision based upon the calculated basis matrix and combination coefficient matrix in the embodiment of the invention than the channel state parameter available in the prior art, and since the channel state parameter is fed back at higher precision, the accuracy of pre-coding can be improved, thus improving the performance of multi-antenna transmission (e.g., a throughput of downlink transmission), and particularly the performance of MU-MIMO transmission.

DETAILED DESCRIPTION

In order to make the objects, technical solutions, and advantages of the invention more apparent, the technical solutions according to the embodiments of the invention will be described below clearly and fully with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

The embodiments of the invention will be described below in further details with reference to the drawings. It shall be appreciated that there embodiments to be described here are only intended to illustrate and explain the invention, but not to limit the invention thereto.

Figure 1:
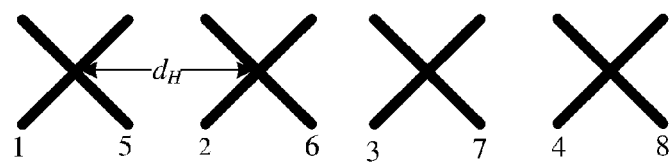
FIG. 1 is a schematic diagram of dual polarized antennas which are arranged horizontally.
Figure 2:
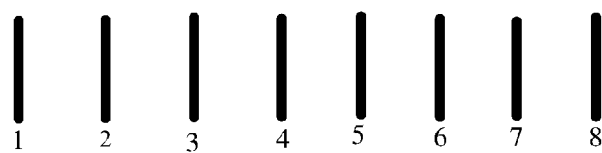
FIG. 2 is a schematic diagram of the linear array antennas which are arranged horizontally.
Figure 3:
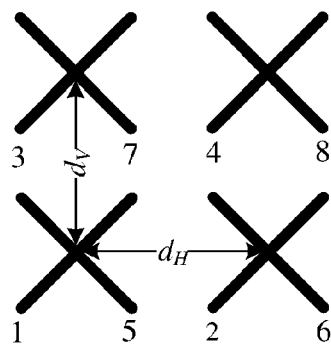
FIG. 3 is a schematic diagram of dual polarized antennas which are arranged in the horizontal and vertical dimensions.
Figure 4:
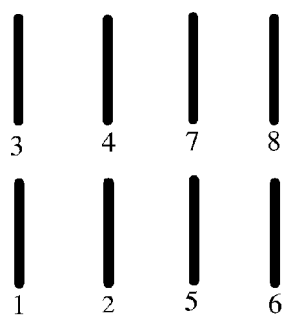
FIG. 4 is a schematic diagram of the linear array antennas which are arranged in the horizontal and vertical dimensions.
Figure 5:
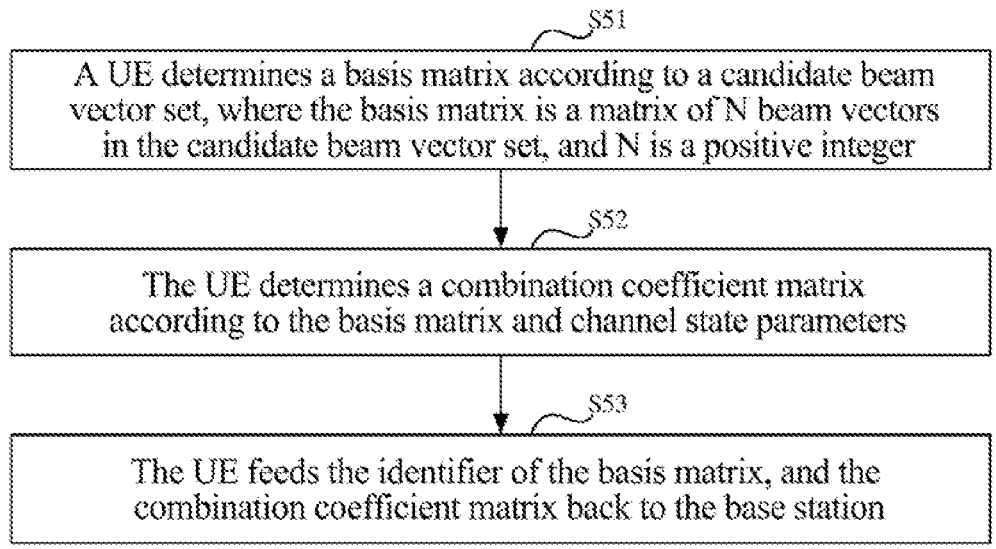
FIG. 5 is a schematic diagram of a method for transmitting channel state information according to an embodiment of the invention.

FIG. 5 illustrates a method for transmitting channel state information according to an embodiment of the invention, where the method includes the following steps.

In the step S51, a UE determines a basis matrix according to a candidate beam vector set, where the basis matrix is a matrix of N beam vectors in the candidate beam vector set, and N is a positive integer.

Here the candidate beam vector set can be prescribed, e.g., in a protocol, or can be determined and then notified by a base station (e.g., eNB) to the UE.

When the candidate beam vector set is determined and then notified by the base station to the UE, then optionally the UE may be notified of the identifiers of beam vectors in the candidate beam vector set, or the UE may be notified of parameters for generating the candidate beam vector set, so that the UE determines the candidate beam vector set according to the parameters.

Optionally the value of N is prescribed, e.g., in a protocol, or determined by the base station and then notified to the UE, or determined by the UE according to the channel of the UE to the base station; and for example, the UE determines the value of N according to the rank (or condition number) of a channel state matrix, where when the rank (or condition number) is less than or equal to a preset first threshold, then N=1 is determined; when the rank (or condition number) is more than the first threshold, and less than or equal to a preset second threshold, then N=2 is determined; and so on.

In the step S52, the UE determines a combination coefficient matrix according to the basis matrix and channel state parameters.

Specifically if channel state parameters in a sub-band for which feedback is to be made by the UE are h, and for example, h is an $N_T \times 1$-dimension column vector without any loss of generality; and if the number of columns is more than 1, then each column may be treated in the same way, so a repeated description thereof will be omitted here. The UE calculates the combination coefficient matrix (if the number of columns in h is more than 1, then ĉ may be a combination coefficient matrix calculated in the same way) in the following steps.

a) $c=B^H h$ or $c=(B^H B)^{-1} B^H h$ is calculated, where $c=[c_1 \ c_2 \ \ldots \ c_N]^T$ (uni-polarized antenna array, or dual polarized antenna array) or $c=[c_1 \ c_2 \ \ldots \ c_{2N}]^T$ (dual polarized antenna array), where $c_i$ and $c_{i+N}$ are combination coefficients of the i-th beam vector, and B represents the basis matrix.

b) c is quantized to obtain ĉ=Quant(c), where Quant( ) represents a quantization function to quantize each element in c.

Optionally C can be quantized by quantizing the real component and the imaginary component respectively of each element in c, or quantizing the amplitude and the phase respectively of each element in c.

Optionally the channel state parameter characterizes channel related information obtained by the UE by measuring a channel, and include but will not be limited to a channel state matrix, a transposition of the channel state matrix, eigenvector(s) of the channel state matrix (e.g., a primary eigenvector of the channel state matrix, eigenvectors corresponding to the two largest eigenvalues in the related matrix, etc.), a pre-coding matrix recommended by the UE, etc.

In order to ensure a quantized interval in a reasonable range, optionally the UE can firstly normalize the elements in the vector c, and then quantize the normalized elements, where the elements in the vector c can be normalized according to $c_i'=c_i/c_{i_0}$, or $c_i'=c_i/|c_{i_0}|$, where $i_0$ is the identifier of the beam vector with the largest metric, or $$i_0 = \arg\max_i |c_i|.$$

Furthermore the UE needs to feed information about $i_0$ back to the base station. There is a feedback overhead of $\lceil \log_2(N) \rceil$ or $\lceil \log_2(2N) \rceil$ bits.

In the step S53, the UE feeds the identifier of the basis matrix, and the combination coefficient matrix back to the base station, so that the base station determines, according to the basis matrix and the combination coefficient matrix, a pre-coding matrix for downlink transmission with the UE.

Optionally the UE can feed the combination coefficient matrix back to the base station by representing the value of each quantized element in a limited number of bits (e.g., 2, 3, 4, etc., bits), and feeding these bits back to the base station.

Optionally the UE can feed the identifier of the basis matrix, and the combination coefficient matrix back to the base station in a piece of signaling, or can feed the identifier of the basis matrix, and the combination coefficient matrix respectively back to the base station in different signalings.

In the embodiment of the invention, the UE determines the basis matrix according to the candidate beam vector set; and the UE determines the combination coefficient matrix according to the basis matrix and the channel state parameter, and feeds the identifier of the basis matrix, and the combination coefficient matrix back to the base station. The channel state parameter can be fed back at higher precision based upon the calculated basis matrix and combination coefficient matrix in the embodiment of the invention than the channel state parameter available in the prior art. Since the channel state parameter is fed back at higher precision, the accuracy of pre-coding can be improved, thus improving the performance of multi-antenna transmission (e.g., a throughput of downlink transmission), and particularly the performance of MU-MIMO transmission.

In a possible implementation, the candidate beam vector set can include over-sampled Discrete Fourier Transform (DFT) vectors.

Specifically for a linear array, if the number of antenna ports is $N_1$, and an over-sampling ratio is $O_1$, then there may be $O_1 N_1$ over-sampled DFT vectors (denoted as $u_k$), which are specifically:

$$u_k = \begin{bmatrix} 1 & e^{j\frac{2\pi k}{N_1 O_1}} & \ldots & e^{j(N_1-1)\frac{2\pi k}{N_1 O_1}} \end{bmatrix}^T, k = 0, 1, 2, \ldots, N_1 O_1 - 1.$$

For a linear dual polarized antenna array, if the number of antenna ports in a polarization direction is $N_1$ then candidate beam vectors may also be $N_1$-dimension over-sampled DFT vectors.

For a planar array, if the numbers of antenna ports in a first dimension (the vertical dimension or the horizontal dimension) and a second dimension (the horizontal dimension or the vertical dimension) in a polarization direction are $N_1$ and $N_2$ respectively, and over-sampling ratio factors in the two dimensions are $O_1$ and $O_2$ respectively, then there may be $O_1 O_2 N_1 N_2$ candidate beam vectors (denoted as $z_{k,l}$):

$$z_{k,l} = \frac{1}{\sqrt{N_1 N_2}} u_k \otimes v_l, k = 0, 1, 2, \ldots N_1 O_1 - 1;$$

$$l = 0, 1, 2, \ldots, N_2 O_2 - 1;$$

Where $$u_k = \begin{bmatrix} 1 & e^{j\frac{2\pi k}{N_1 O_1}} & \ldots & e^{j(N_1-1)\frac{2\pi k}{N_1 O_1}} \end{bmatrix}^T, \text{ and}$$

$$v_l = \begin{bmatrix} 1 & e^{j\frac{2\pi l}{N_2 O_2}} & \ldots & e^{j(N_2-1)\frac{2\pi l}{N_2 O_2}} \end{bmatrix}^T.$$

Further to the implementation above of the candidate beam vector set, if the candidate beam vector set is determined by the base station, and then the UE is notified of the parameters of the candidate beam vector set, then for a linear array, the parameters may be $O_1, N_1$, and for a planar array, the parameters may be $O_1, O_2, N_1, N_2$.

Of course, the candidate beam vectors may be implemented otherwise than the over-sampled DFT vectors, and the embodiment of the invention will not be limited thereto.

Without any loss of generality, the number of beam vectors in the candidate beam vector set in the embodiment of the invention is denoted as M, where the vectors are denoted as $b_0, b_1, b_2, \ldots, b_{M-1}$. If N beam vectors selected from the candidate beam vector set are $d_1, d_2, \ldots, d_N$, then the basis matrix B may be implemented as follows.

$B=[d_1 \ d_2 \ \ldots \ d_N]$ is applicable to a linear array and a dually polarized array.

The basis matrix B may alternatively be implemented as $$B = \begin{bmatrix} d_1 \ d_2 \ \ldots \ d_N & 0 \\ 0 & d_1 \ d_2 \ \ldots \ d_N \end{bmatrix},$$

where a matrix on the primary diagonal of the block diagonal matrix includes N selected beam vectors, and is applicable to a dual polarized array.

Further to any one of the embodiments above, the UE determines the basis matrix according to the candidate beam vector set in the step S51 in the following three possible implementations.

In a first implementation, the UE selects the first N beam vectors from the candidate beam vector set in a descending order of their metrics; and determines a matrix of the selected N beam vectors as the basis matrix. This implementation has a low implementation complexity, and is easy to realize.

Here the metric includes but will not be limited to received signal power in beam-formed transmission, a channel capacity, etc.

For example, the UE selects N beam vectors with the highest received signal power to form the basis matrix, where the beam vector with the highest received signal power (i.e., the first strongest beam vector) can be determined as follows.

$$d_1 = \underset{b_k \; k=0,1,2,\ldots M-1}{\operatorname{argmax}} (b_k)^H R_{00} b_k, \quad 1)$$

where $R_{00}$ represents correlation of channel state matrixes of different transmit antennas in a polarization direction; or $$d_1 = \underset{b_k \; k=0,1,2,\ldots M-1}{\operatorname{argmax}} (b_k)^H (R_{00} + R_{11}) b_k, \quad 2)$$

where $R_{11}$ represents correlation of channel state matrixes of the different transmit antennas in another polarization direction; or $$d_1 = \underset{b_k \; k=0,1,2,\ldots M-1}{\operatorname{argmax}} (b_k)^H R_{11} b_k. \quad 3)$$

Alike the second strongest beam vector to the N-th strongest beam vector can also be determined in a similar way, although a repeated description thereof will be omitted here.

In another example, the N beam vectors selected by the UE can be determined as follows:

$$[d_1, d_2, \ldots, d_N] = \underset{[b_{i_0}, b_{i_1}, \ldots, b_{i_{N-1}}], i_m \in \{0,1,2,\ldots M-1\}, i_m \neq i_n}{\operatorname{argmax}} C(b_{i_0}, b_{i_1}, \ldots, b_{i_{N-1}}).$$

Where the metric can be a channel capacity, e.g., $$C(b_{i_0}, b_{i_1}, \ldots, b_{i_{N-1}}) = \sum_{n=0}^{N-1} \log_2(1 + SINR_{i_n}),$$

where $SINR_{i_n}$ is a useful Signal to Interference (plus Noise) Ratio (SINR) in transmission beam-formed using $b_{i_n}$.

In another example, the N beam vectors selected by the UE can be determined as follows:

$$C(b_{i_0}, b_{i_1}, \ldots, b_{i_{N-1}}) = \sum_{n=0}^{N-1} (b_{i_n})^H R_{00} b_{i_n},$$

that is, the sum of received power of the N selected beam vectors is largest.

In this implementation, optionally any two of the N beam vectors are orthogonal to each other.

For example, after the first strongest beam vector is determined, the second strongest beam vector is selected so that the second strongest beam vector is orthogonal to the first strongest beam vector, the third strongest beam vector is selected so that the third strongest beam vector is orthogonal to both the first and the second strongest beam vectors, and so on. Specifically as follows:

$$d_n = \underset{\{b_k | k \in \{0,1,2,\ldots M-1\}, (b_k)^H d_m = 0, m=1,2,\ldots,n-1\}}{\operatorname{argmax}} (b_k)^H R_{00} b_k,$$

where $n = 1, 2, \ldots, N-1$.

In a second implementation, the UE selects one of L beam vector groups, where L beam vector groups are obtained by grouping beam vectors in the candidate beam vector set, and L is a positive integer; and the UE selects N beam vectors from the selected beam vector group, and determines a matrix of the selected N beam vectors as the basis matrix.

In the scenario where each two of the N beam vectors are orthogonal to each other, the second implementation has a low implementation complexity, and is easy to realize.

In this implementation, the L beam vector groups can be prescribed or configured, or can be determined by the base station and notified to the UE, or can be obtained by the UE by grouping the beam vectors in the candidate beam vector set.

Optionally the UE groups the beam vectors in the candidate beam vector set into the L beam vector groups according to the orthogonality of the beam vectors in the candidate beam vector set.

Furthermore the UE selects one of the L beam vector groups in the following two possible implementations.

In an implementation 21, the UE selects, from the L beam vector groups, a beam vector group including the beam vector with the largest metric.

In an implementation 22, the UE determines a metric corresponding to each beam vector group, and selects the beam vector group with the largest metric, where the metric corresponding to each beam vector group is a value obtained by performing a preset operation on metrics of beam vectors in the beam vector group.

For example, the metric corresponding to each beam vector group can be the sum of the metrics of the beam vectors in the beam vector group:

$$f_p = \sum_{k=0}^{K_p-1} (b_{p,k})^H R_{00} b_{p,k},$$

where $f_p$ is a metric of the p-th beam vector group, $K_p$ is the number of beam vectors in the p-th beam vector group, and $b_{p,k}$ is the k-th beam vector in the p-th beam vector group.

In another example, the metric corresponding to each beam vector group can be the product of the metrics of the beam vectors in the beam vector group.

In this implementation, optionally any two of the N beam vectors are orthogonal to each other.

In this implementation, optionally any two beam vectors in each beam vector group are orthogonal to each other.

When the UE groups the beam vectors into the beam vector groups, then the UE may group the beam vectors into the beam vector groups by grouping the beam vectors in the candidate beam vector set into L beam vector groups according to their orthogonality so that any two beam vectors in each beam vector group are orthogonal to each other.

For example, the candidate beam vectors are formed of over-sampled DFT vectors, and can be grouped into $O_1O_2$ orthogonal beam vector groups, where each orthogonal beam vector group includes $N_1N_2$ beam vectors, each two of which are orthogonal to each other. The $(O_2p+q)$-th ($p=0, 1, \ldots, O_1-1; q=0, 1, 2, \ldots, O_2-1$) orthogonal beam vector group includes the following beam vectors:

$$\{z_{k,l}|k=p,p+O_1,p+2O_1,\ldots,p+(N_1-1)O_1; l=q,q+O_2, q+2O_2,\ldots,q+(N_2-1)O_2\}.$$

Figure 6:
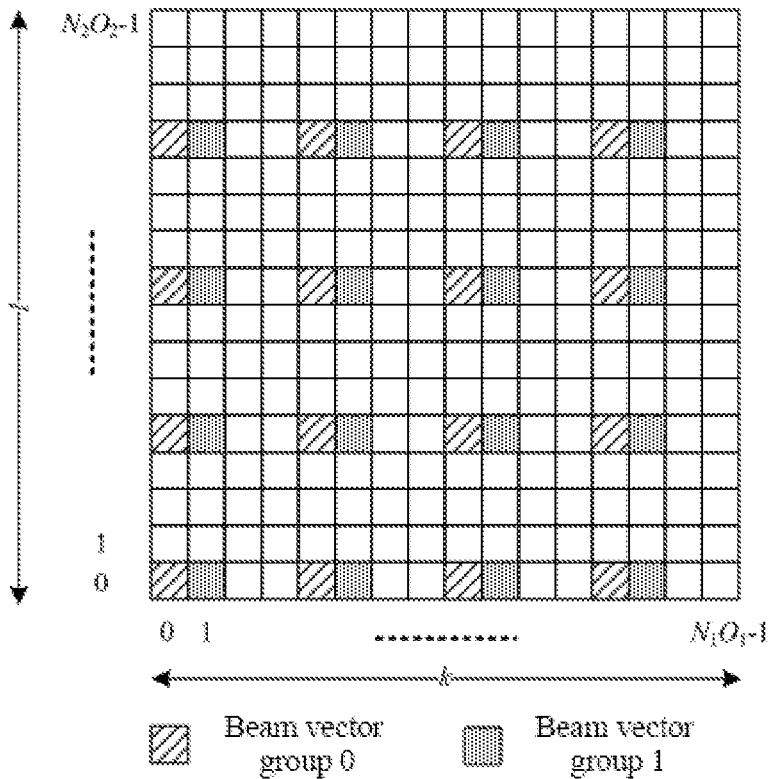
FIG. 6 is a schematic diagram of grouping of beam vectors according to an embodiment of the invention.

In a possible grouping scheme as illustrated in FIG. 6, $N_1=N_2=4$; $O_1=O_2=4$, where DFT vectors represented by squares filled with the same pattern belong to the same beam vector group.

In this implementation, the N beam vectors are selected from the selected beam vector group in the same way as the N beam vectors are selected from the candidate beam vector set in the first implementation, so a repeated description thereof will be omitted here.

In a third implementation, the UE selects T beam vectors from the candidate beam vector set, where T is more than N; and the UE selects N beam vectors from the T beam vectors, and determines a matrix of the selected N beam vectors as the basis matrix.

In this implementation, the identifier of the basis matrix can be fed back at two levels (specifically as described in the following implementation D) with a low feedback overhead.

In this implementation, the T beam vectors are selected from the candidate beam vector set in the same way as the N beam vectors are selected from the candidate beam vector set in the first implementation, so a repeated description thereof will be omitted here.

In this implementation, the N beam vectors are selected from the T beam vectors in the same way as the N beam vectors are selected from the candidate beam vector set in the first implementation, so a repeated description thereof will be omitted here.

In this implementation, optionally any two of the selected T beam vectors are orthogonal to each other; and/or any two of the N beam vectors selected from the T beam vectors are orthogonal to each other.

Further to any one of the embodiments above, the UE feeds the identifier of the basis matrix back to the base station in the step S53 as follows.

In an implementation A, the UE feeds the identifiers of the N beam vectors in the candidate beam vector set back to the base station.

This implementation is applicable to any one of the embodiments above, and there is a feedback overhead of $N\lceil \log_2(M)\rceil$ in this implementation, where $\lceil \log_2(M)\rceil$ represents the smallest positive integer no less than $\log_2(M)$.

Optionally the UE can further feed back the identifier, of the beam vector with the largest metric in the basis matrix, in the N beam vectors, there is an additional feedback overhead of $\lceil \log_2(N)\rceil$ bits, so that the base station can determine the beam vector with the largest metric for quantizing the combination coefficient matrix.

In an implementation B, the UE feeds back to the base station the joint encoded information of identifiers of a part or all of the N beam vectors.

In this implementation, when the UE feeds back to the base station the joint encoded information of identifiers of a part or all of the N beam vectors, the UE further feeds the identifiers, of the other part of the N beam vectors, in the candidate beam vector set back to the base station.

This implementation is applicable to any one of the embodiments of the invention, and further includes the following two possible implementations.

In an implementation B1, the UE feeds back to the base station the joint encoded information of the identifiers of the N beam vectors in the candidate beam vector set.

Specifically all the possible combinations of N beams selected from the candidate beam vector set $$\left(\binom{M}{N}=\frac{M!}{N!(M-N)!} \text{ possible combinations}\right)$$

are numbered, and the number corresponding to a combination of N beam vectors selected by the UE is determined as the joint encoded information of the identifiers of the N beam vectors in the candidate beam vector set.

In this implementation, there is a feedback overhead of $$\left\lceil \log_2\left(\binom{M}{N}\right)\right\rceil = \left\lceil \log_2\left(\frac{M!}{N!(M-N)!}\right)\right\rceil.$$

Since each two of the N beam vectors are different from each other, a feedback overhead can be lowered through joint encoding in this feedback scheme.

Optionally the UE can further feed back the identifier, of the beam vector with the largest metric in the basis matrix, among the N beam vectors, there is an additional feedback overhead of $\lceil \log_2(N)\rceil$ bits, so that the base station can determine the beam vector with the largest metric for quantizing the combination coefficient matrix.

In an implementation B2, the UE feeds the identifier of the beam vector with the largest metric among the N beam vectors, in the candidate beam vector set, and joint encoded information of the identifiers of the other N−1 beam vectors in the candidate beam vector set back to the base station.

Specifically the UE feeds back the identifier of the beam vector with the largest metric among the N beam vectors, in the candidate beam vector set, and joint encoded information of the identifiers of the other N−1 beam vectors in the candidate beam vector set, with a feedback overhead of:

$$\lceil \log_2(M)\rceil + \left\lceil \log_2\left(\binom{M-1}{N-1}\right)\right\rceil = \lceil \log_2(M)\rceil + \left\lceil \log_2\left(\frac{(M-1)!}{(N-1)!(M-N)!}\right)\right\rceil.$$

In an implementation B3, the UE feeds back to the base station the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set.

In an implementation C, the UE feeds back to the base station the identifier of the beam vector with the largest metric among the N beam vectors, in the candidate beam vector set, and the identifiers of the other N−1 beam vectors in a set of all the beam vectors orthogonal to the beam vector with the largest metric in the candidate beam vector set.

This implementation is applicable to any one of the embodiments above, and in this implementation, the UE feeds back the identifier of the beam vector with the largest metric among the N beam vectors, in the candidate beam vector set, and the identifiers of the other N−1 beam vectors in the set of all the beam vectors orthogonal to the beam vector with the largest metric in the candidate beam vector set, in a feedback overhead of:

$$\lceil \log_2(M) \rceil + \left\lceil \log_2\left(\binom{K}{N-1}\right) \right\rceil = \lceil \log_2(M) \rceil + \left\lceil \log_2\left(\frac{K!}{(N-1)!(K-N+1)!}\right) \right\rceil$$

(the identifiers of the N−1 beam vectors are encoded jointly), or $\lceil \log_2(M) \rceil + (N-1)\lceil \log_2(K) \rceil$ (the identifiers of the N−1 beam vectors are encoded separately), where K is the number of beam vectors orthogonal to the beam vector with the largest metric.

In an implementation D, the UE feeds the identifiers of the T beam vectors back to the base station as first-level identification information, and the UE feeds the identifiers of the N beam vectors in the T beam vectors back to the base station as second-level identification information.

This implementation is applicable to the third implementation above, and an overhead for feeding back the identifiers of the N beam vectors at two levels is $N\lceil \log_2(T) \rceil$ (the identifier of each beam vector is encoded separately) or $$\left\lceil \log_2\left(\binom{T}{N}\right) \right\rceil = \left\lceil \log_2\left(\frac{T!}{N!(T-N)!}\right) \right\rceil$$

(the identifiers of the N beam vectors are encoded jointly).

Since the set from which the beam vectors are selected for the second-level feedback (i.e., the set of the T beam vectors) is smaller than the candidate beam vector set, an overhead of the second-level feedback can be lowered.

Optionally the first-level identification information can be the identifiers of the T beam vectors in the candidate beam vector set, or can be the number of the selected combination of T beam vectors among all the possible combinations of T beam vectors from the beam vectors in the candidate beam vector set, that is, all the possible combinations of T beam vectors selected from the candidate beam vector set $$\left(\binom{M}{T} = \frac{M!}{T!(M-T)!} \text{ possible combinations}\right)$$

are numbered, and the number corresponding to the combination of T beam vectors selected by the UE is determined as the first-level identification information; or can be the number of the vector group of the T selected beam vectors among the vector groups into which the candidate beam vector set is grouped, that is, the beam vectors in the candidate beam vector set are grouped into a plurality of vector groups, each of which includes T beam vectors, the respective vector groups are numbered, and the number of the vector group including the T selected beam vectors is determined as the first-level identification information.

Optionally the first-level identification information and the second-level identification information is fed back at different instances of time. For example, the first-level identification information is fed back at a longer interval of time than an interval of time at which the second-level identification information is fed back. When the identification information is fed back periodically, then the first-level identification information can be fed back at a longer periodicity than a periodicity at which the second-level identification information is fed back; and when the identification information is fed back aperiodically, then feedback of the first-level identification information and the second-level identification information may be triggered separately, and feedback of the second-level identification information may be triggered at a higher frequency than a frequency at which feedback of the first-level identification information is triggered.

Optionally the first-level identification information and the second-level identification information is fed back at the same instance of time for different bandwidths. For example, the first-level identification information is fed back for a broad band, and the beam vector is selected based on a channel throughout the bandwidth, that is, a received signal strength of the beam vector, or a channel capacity refers to an average throughout the bandwidth; and the second-level identification information is fed back for a sub-band, and a beam vector is selected for a channel in a sub-band based upon the first-level feedback, that is, a received signal strength of the beam vector, or a channel capacity refers to an average in a sub-band.

Optionally the first-level identification information and the second-level identification information is fed back at different instances of time for different bandwidths.

Optionally the UE can further feed back the identifier, of the beam vector with the largest metric in the basis matrix, among the N beam vectors, with an additional feedback overhead of $\lceil \log_2(N) \rceil$ bits, so that the base station can determine the beam vector with the largest metric for quantizing the combination coefficient matrix.

In an implementation E, the UE feeds the identifier of the selected beam vector group, and the identifiers of the n beam vectors in the selected beam vector group back to the base station.

This implementation is applicable to the second implementation above, and when there are K beam vectors in the beam vector group selected by the UE, then there may be a feedback overhead of $\lceil \log_2(L) \rceil + N \lceil \log_2(K) \rceil$ bits (the UE feeds back the identifier of each beam vector in the selected beam vector group) or $$\lceil \log_2(L) \rceil + \left\lceil \log_2\left(\binom{K}{N}\right) \right\rceil = \lceil \log_2(L) \rceil + \left\lceil \log_2\left(\frac{K!}{N!(K-N)!}\right) \right\rceil$$

bits (the UE feeds back joint encoded information of identifiers of the N beam vectors in the selected beam vector group).

Optionally the UE can further feed back the identifier, of the beam vector with the largest metric in the basis matrix, among the N beam vectors, with an additional feedback overhead of $\lceil \log_2(N) \rceil$ bits, so that the base station can determine the beam vector with the largest metric for quantizing the combination coefficient matrix.

Further to any one of the embodiments above, after the UE determines the combination coefficient matrix according to the basis matrix and the channel state parameters in the step S52, the method further includes the followings.

The UE determines a pre-coding matrix according to the basis matrix and the combination coefficient matrix.

The UE determines a Channel Quality Indicator (CQI) according to the pre-coding matrix.

The UE feeds the CQI back to the base station.

Specifically the CQI is calculated in such a way that the UE recommends a pre-coding matrix $\alpha B\hat{c}$, where $\alpha=1/\|B\hat{c}\|_F$, and the CQI is calculated based upon the pre-coding matrix, where $\|B\hat{c}\|_F$ represents a Fresenius norm of the matrix $B\hat{c}$.

Figure 7:
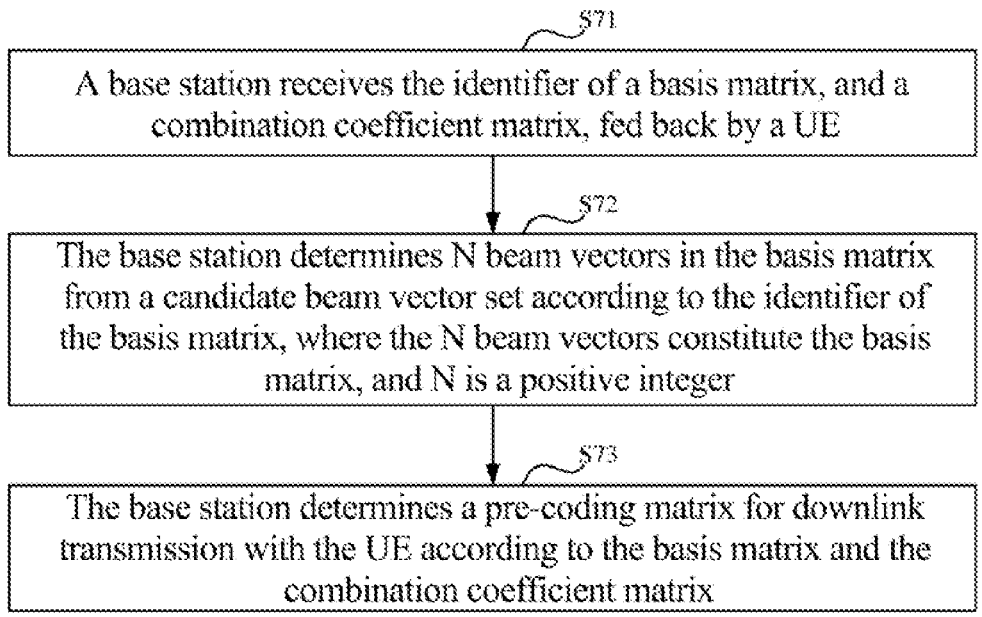
FIG. 7 is a schematic diagram of a method for receiving channel state information according to an embodiment of the invention.

Based upon the same inventive idea, FIG. 7 illustrates a method for receiving channel state information according to an embodiment of the invention, where the method includes the following steps.

In the step S71, a base station receives the identifier of a basis matrix, and a combination coefficient matrix, fed back by a UE.

In the step S2, the base station determines N beam vectors in the basis matrix from a candidate beam vector set according to the identifier of the basis matrix, where the N beam vectors constitute the basis matrix, and N is a positive integer.

Optionally the identifier of a basis matrix is prescribed, or is determined by the base station and then notified to the UE, specifically as described in the embodiment as illustrated in FIG. 5.

Optionally the value of N is prescribed, or is determined by the base station and then notified to the UE, or determined by the UE as a result of channel measurement with the base station, and notified to the base station, specifically as described in the embodiment as illustrated in FIG. 5.

In the step S73, the base station determines a pre-coding matrix for downlink transmission with the UE according to the basis matrix and the combination coefficient matrix, to perform downlink transmission based upon the determined pre-coding matrix.

In the embodiment of the invention, the base station determines the pre-coding matrix according to the basis matrix and the combination coefficient matrix in the step S73 in the following possible implementations.

In a first implementation, the determined pre-coding matrix is $W=\alpha B\hat{c}$ where $\alpha B\hat{c}$, where $\alpha=1/\|B\hat{c}\|_F$.

Or, in a second implementation, the determined pre-coding matrix is a matrix of eigenvectors corresponding to the largest one or more eigenvalues in the matrix $B\hat{c}(B\hat{c})^H$.

Or in a third implementation, the determined pre-coding matrix is a matrix of eigenvectors corresponding to the largest one or more eigenvalues in the matrix $(B\hat{c})^H B\hat{c}$.

Here the matrix B is the basis matrix determined by the base station, and the matrix $\hat{c}$ is the combination coefficient matrix, fed back by the UE, received by the base station.

In the embodiment of the invention, the base station receives the identifier of the basis matrix fed back by the UE as follows.

The base station receives the identifiers of the N beam vectors in the candidate beam vector set, which are fed back by the UE, specifically as described in the implementation A above.

Or the base station receives joint encoded information of identifiers of a part or all of the N beam vectors, which are fed back by the UE, specifically as described in the implementation B above.

Or the base station receives the identifier of a beam vector group selected by the UE, and the identifiers of the N beam vectors in the selected beam vector group, which are fed back by the UE, where the beam vector group is consisted of a part of beam vectors in the candidate beam vector set, specifically as described in the implementation E above.

Or the base station receives the identifier, of the beam vector with the largest metric among the N beam vectors, in the candidate beam vector set, and the identifiers of the other N−1 beam vectors in a set of all the beam vectors orthogonal to the beam vector with the largest metric in the candidate beam vector set, which are fed back by the UE, specifically as described in the implementation C above.

Or the base station receives first-level identification information and second-level identification information fed back by the UE, where the first-level identification information is the identifiers, of T beam vectors selected by the UE from the candidate beam vector set, in the candidate beam vector set, and the second-level identification information are the identifiers of the N beam vectors in the T beam vectors, specifically as described in the implementation D above.

Here the base station receives the joint encoded information of identifiers of the part or all of the N beam vectors, which are fed back by the UE as follows.

The base station receives joint encoded information of identifiers of the N beam vectors in the candidate beam vector set, which are fed back by the UE, specifically as described in the implementation B1 above.

Or the base station receives identifiers of the beam vector with the largest metric among the N beam vectors, in the candidate beam vector set, and joint encoded information of identifiers of the other N−1 beam vectors in the candidate beam vector set, which are fed back by the UE, specifically as described in the implementation B2 above.

Or the base station receives identifiers of the beam vector with the largest metric among the N beam vectors, in the candidate beam vector set, and joint encoded information of identifiers of the other N−1 beam vectors in a set of all the beam vectors orthogonal to the beam vector with the largest metric in the candidate beam vector set, which are fed back by the UE, specifically as described in the implementation B3 above.

Further to any one of the embodiments above, the method further includes the followings.

The base station receives the identifier, of the beam vector with the largest metric among the N beam vectors, among the N beam vectors, which is fed back by the UE.

The processing flows of the methods above can be performed in software program, the software program can be stored in a storage medium, and when the stored software program is invoked, it can perform the steps in the methods above.

Based upon the same inventive idea, an embodiment of the invention further provides a UE, and since the UE addresses the problem under a similar principle to the method as illustrated in FIG. 5, reference can be made to the related description in the implementation of the method as illustrated in FIG. 5 for an implementation of the apparatus, and a repeated description thereof will be omitted here.

Figure 8:
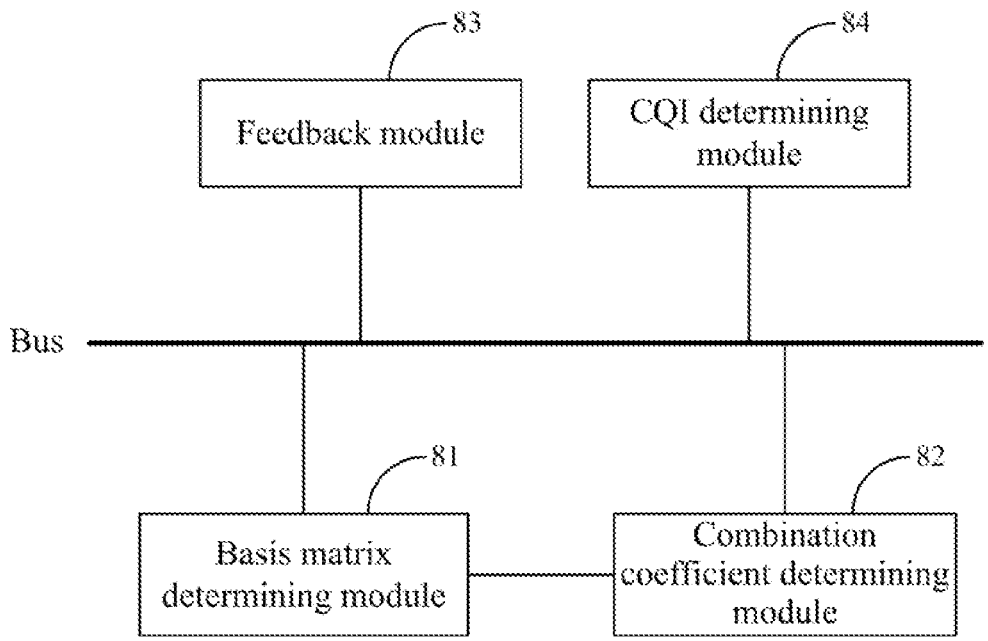
FIG. 8 is a schematic diagram of a UE according to an embodiment of the invention.

FIG. 8 illustrates a UE according to an embodiment of the invention, where the UE includes the followings.

A basis matrix determining module 81 is configured to determine a basis matrix according to a candidate beam vector set, where the basis matrix is a matrix of N beam vectors in the candidate beam vector set, and N is a positive integer.

A combination coefficient determining module 82 is configured to determine a combination coefficient matrix according to the basis matrix and the channel state parameter.

A feedback module 83 is configured to feed the identifier of the basis matrix, and the combination coefficient matrix back to a base station.

Optionally the basis matrix determining module 81 is configured: to select the first N beam vectors from the candidate beam vector set in a descending order of their metrics, and to determine a matrix of the selected N beam vectors as the basis matrix; or to select one of L beam vector groups, where the L beam vector groups are obtained by grouping beam vectors in the candidate beam vector set, and L is a positive integer; and to select N beam vectors from the selected beam vector group, and to determine a matrix of the selected N beam vectors as the basis matrix; or to select T beam vectors from the candidate beam vector set, where T is more than N; and to select N beam vectors from the T beam vectors, and to determine a matrix of the selected N beam vectors as the basis matrix.

Optionally the basis matrix determining module 81 is configured: to select a beam vector group including the beam vector with the largest metric from the L beam vector groups; or to determine a metric corresponding to each beam vector group, and to select the beam vector group with the largest metric, where the metric corresponding to each beam vector group is a value obtained by performing a preset operation on metrics of the beam vectors in the beam vector group.

Optionally any two of the N beam vectors are orthogonal to each other; and/or any two beam vectors in each beam vector group are orthogonal to each other.

Further to any one of the embodiments above, in a possible implementation, the feedback module 83 is configured: to feed the identifiers of the N beam vectors in the candidate beam vector set back to the base station; or to feed joint encoded information of identifiers of a part or all of the N beam vectors back to the base station; or to feed the identifier of the beam vector with the largest metric among the N beam vectors, in the candidate beam vector set, and the identifiers of the other N−1 beam vectors in a set of all the beam vectors orthogonal to the beam vector with the largest metric in the candidate beam vector set back to the base station.

Furthermore the feedback module 83 is configured: to feed joint encoded information of identifiers of the N beam vectors in the candidate beam vector set back to the base station; or to feed the identifier of the beam vector with the largest metric among the N beam vectors, in the candidate beam vector set, and joint encoded information of the identifiers of the other N−1 beam vectors in the candidate beam vector set back to the base station; or to feed the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set back to the base station.

In another possible implementation, the feedback module 83 is configured: to feed the identifier of a selected beam vector group, and the identifiers of the N beam vectors in the selected beam vector group back to the base station.

In another possible implementation, the feedback module 83 is configured: to feed the identifiers of the T beam vectors in the candidate beam vector set back to the base station as first-level identification information, and to feed the identifiers of the N beam vectors among the T beam vectors back to the base station as second-level identification information.

Further to any one of the embodiments above, the feedback module 83 is further configured: to feed the identifier, of the beam vector with the largest metric among the N beam vectors, in the N beam vectors back to the base station.

Further to any one of the embodiments above, the UE further includes: a CQI determining module 84 is configured to determine a pre-coding matrix according to the basis matrix and the combination coefficient matrix, and to determine a CQI according to the pre-coding matrix; and the feedback module 83 is further configured to feed the CQI back to the base station.

Figure 9:
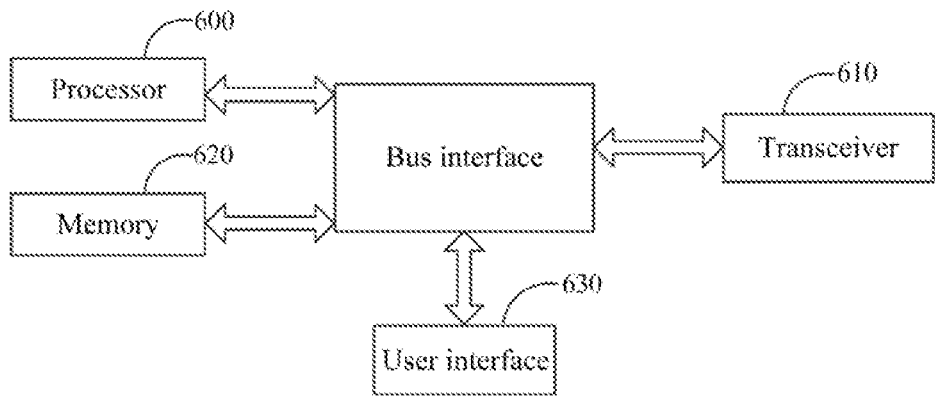
FIG. 9 is a schematic diagram of another UE according to an embodiment of the invention.
Figure 10:
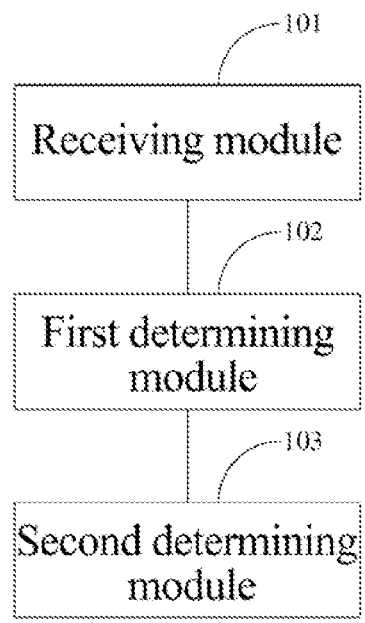
FIG. 10 is a schematic diagram of a base station according to an embodiment of the invention.

FIG. 9 illustrates another UE according to an embodiment of the invention, where the UE includes a transceiver, and at least one processor connected with the transceiver.

The processor 600 is configured to read and execute program in the memory 620: to determine a basis matrix according to a candidate beam vector set, where the basis matrix is a matrix of N beam vectors in the candidate beam vector set, and N is a positive integer; to determine a combination coefficient matrix according to the basis matrix and a channel state parameter; and to control the transceiver 610 to feed the identifier of the basis matrix, and the combination coefficient matrix back to a base station.

The transceiver 610 is configured to receive and transmit data under the control of the processor 600.

Here in FIG. 9, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. For different user equipments, the user interface 630 can also be an interface via which devices are connected internally and externally as needed, and the connected devices include but will not be limited to a keypad, a monitor, a speaker, a microphone, a joystick, etc. The processor 600 is responsible for managing the bus architecture and performing normal processes, and can further provide various functions of timing, a peripheral interface, voltage regulation, power source management, and other control functions. The memory 620 can store data for use by the processor 600 in performing the operations.

Optionally the processor 600 can be a Central Processing Unit (CPU), an Application-Specific Integrated Circuit (ASIC), a Field-Programmable Gate Array (FPGA), or a Complex Programmable Logic Device (CPLD).

In the embodiment of the invention, the processor 600 reads the program in the memory 620, and performs the method according to the embodiment as illustrated in FIG. 5, and reference can be made to the related description in the embodiment as illustrated in FIG. 5 for details thereof, so a repeated description thereof will be omitted here.

Based upon the same inventive idea, an embodiment of the invention further provides a base station, and since the base station addresses the problem under a similar principle to the method as illustrated in FIG. 7, reference can be made to the related description in the implementation of the method as illustrated in FIG. 7 for an implementation of the apparatus, and a repeated description thereof will be omitted here.

FIG. 9 illustrates a base station according to an embodiment of the invention, where the base station includes the followings.

A receiving module 101 is configured to receive the identifier of a basis matrix, and a combination coefficient matrix, fed back by a UE.

A first determining module 102 is configured to determine N beam vectors in the basis matrix from a candidate beam vector set according to the identifier of the basis matrix, where the N beam vectors constitute the basis matrix, and N is a positive integer.

A second determining module 103 is configured to determine a pre-coding matrix for downlink transmission with the UE according to the basis matrix and the combination coefficient matrix.

Optionally the receiving module 101 is configured: to receive the identifiers of the N beam vectors in the candidate beam vector set, which are fed back by the UE; or to receive joint encoded information of identifiers of a part or all of the N beam vectors, which are fed back by the UE; or to receive the identifier of a beam vector group selected by the UE, and the identifiers of the N beam vectors in the selected beam vector group, which are fed back by the UE, where the beam vector group is consisted of a part of beam vectors in the candidate beam vector set; or to receive the identifier, of the beam vector with the largest metric among the N beam vectors, in the candidate beam vector set, and the identifiers of the other N−1 beam vectors in a set of all the beam vectors orthogonal to the beam vector with the largest metric in the candidate beam vector set, which are fed back by the UE; or to receive first-level identification information and second-level identification information fed back by the UE, where the first-level identification information is the identifiers, of T beam vectors selected by the UE from the candidate beam vector set, in the candidate beam vector set, and the second-level identification information is the identifiers of the N beam vectors in the T beam vectors.

Furthermore the receiving module 101 is configured: to receive joint encoded information of identifiers of the N beam vectors in the candidate beam vector set, which are fed back by the UE; or to receive the identifier of the beam vector with the largest metric among the N beam vectors, in the candidate beam vector set, and joint encoded information of the identifiers of the other N−1 beam vectors in the candidate beam vector set, which are fed back by the UE; or to receive the identifier of the beam vector with the largest metric among the N beam vectors, in the candidate beam vector set, and joint encoded information of the identifiers of the other N−1 beam vectors in a set of all the beam vectors orthogonal to the beam vector with the largest metric in the candidate beam vector set, which are fed back by the UE.

Optionally the receiving module 101 is further configured: to receive the identifier, of the beam vector with the largest metric among the N beam vectors, in the N beam vectors, which is fed back by the UE.

Figure 11:
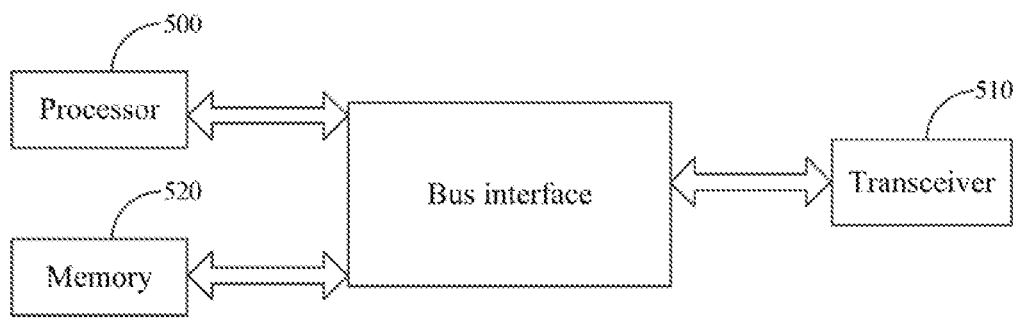
FIG. 11 is a schematic diagram of another base station according to an embodiment of the invention.

FIG. 11 illustrates another base station according to an embodiment of the invention, where the UE includes a transceiver, and at least one processor connected with the transceiver.

The processor 500 is configured to read and execute program in the memory 520: to receive the identifier of a basis matrix, and a combination coefficient matrix, fed back by a UE through the transceiver 510; to determine N beam vectors in the basis matrix from a candidate beam vector set according to the identifier of the basis matrix, where the N beam vectors constitute the basis matrix, and N is a positive integer; and to determine a pre-coding matrix for downlink transmission with the UE according to the basis matrix and the combination coefficient matrix.

The transceiver 510 is configured to receive and transmit data under the control of the processor 500.

Here in FIG. 11, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are units for communication with various other devices over a transmission medium. The processor 500 is responsible for managing the bus architecture and performing normal processes, and can further provide various functions of timing, a peripheral interface, voltage regulation, power source management, and other control functions. The memory 520 can store data for use by the processor 500 in performing the operations.

Optionally the processor 500 can be a CPU, an ASIC, an FPGA, or a CPLD.

In the embodiment of the invention, the processor 500 reads the program in the memory 520, and performs the method according to the embodiment as illustrated in FIG. 7, and reference can be made to the related description in the embodiment as illustrated in FIG. 7 for details thereof, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting channel state information, comprising:
   determining, by a UE, a basis matrix according to a candidate beam vector set, wherein the basis matrix is a matrix of N beam vectors in the candidate beam vector set, and N is a positive integer;
   determining, by the UE, a combination coefficient matrix according to the basis matrix and a channel state parameter independent of the basis matrix; and
   feeding, by the UE, an identifier of the basis matrix, and the combination coefficient matrix back to a base station;
   wherein the basis matrix and the combination coefficient matrix are used for determining a pre-coding matrix for downlink transmission by the base station.

2. The method according to claim 1, wherein a value of N is prescribed, or is determined by the base station and then notified to the UE, or is determined by the UE according to a channel condition between the UE and the base station.

3. The method according to claim 1, wherein determining, by the UE, the basis matrix according to the candidate beam vector set comprises:
   selecting, by the UE, first N beam vectors from the candidate beam vector set in a descending order of their metrics, and determining a matrix of the selected N beam vectors as the basis matrix; or
   selecting, by the UE, one of L beam vector groups, wherein the L beam vector groups are obtained by grouping beam vectors in the candidate beam vector set, and L is a positive integer; and selecting N beam vectors from the selected beam vector group, and determining a matrix of the selected N beam vectors as the basis matrix; or
   selecting, by the UE, T beam vectors from the candidate beam vector set, wherein T is more than N; and selecting N beam vectors from the T beam vectors, and determining a matrix of the selected N beam vectors as the basis matrix.

4. The method according to claim 3, wherein selecting, by the UE, one of L beam vector groups comprises:
   selecting, by the UE, a beam vector group comprising a beam vector with a largest metric from the L beam vector groups; or
   determining, by the UE, a metric corresponding to each of the beam vector groups, and selecting the beam vector group with a largest metric, wherein the metric corresponding to each of the beam vector groups is a value obtained by performing a preset operation on metrics of the beam vectors in the beam vector group.

5. The method according to claim 3, wherein any two of the N beam vectors are orthogonal to each other; and/or any two beam vectors in each of the beam vector groups are orthogonal to each other.

6. The method according to claim 3, wherein when the UE selects one of the L beam vector groups, and selects N beam vectors from the selected beam vector group, feeding, by the UE, the identifier of the basis matrix back to the base station comprises:
   feeding, by the UE, an identifier of the selected beam vector group, and identifiers of the N beam vectors in the selected beam vector group back to the base station.

7. The method according to claim 3, wherein when the UE selects T beam vectors from the candidate beam vector set, and selects N beam vectors from the T beam vectors, feeding, by the UE, the identifier of the basis matrix back to the base station comprises:
   feeding, by the UE, identifiers of the T beam vectors back to the base station as first-level identification information, and feeding, by the UE, identifiers of the N beam vectors in the T beam vectors back to the base station as second-level identification information.

8. The method according to claim 1, wherein feeding, by the UE, the identifier of the basis matrix back to the base station comprises:
   feeding, by the UE, identifiers of the N beam vectors in the candidate beam vector set back to the base station; or
   feeding, by the UE, joint encoded information of identifiers of a part or all of the N beam vectors back to the base station; or
   feeding, by the UE, an identifier of the beam vector with a largest metric among the N beam vectors, in the candidate beam vector set, and identifiers of the other N−1 beam vectors in a set of all the beam vectors orthogonal to the beam vector with the largest metric in the candidate beam vector set back to the base station.

9. The method according to claim 8, wherein feeding, by the UE, the joint encoded information of identifiers of a part or all of the N beam vectors back to the base station comprises:
   feeding, by the UE, joint encoded information of identifiers of the N beam vectors in the candidate beam vector set back to the base station; or
   feeding, by the UE, the identifier of the beam vector with the largest metric among the N beam vectors, in the candidate beam vector set, and joint encoded information of the identifiers of the other N−1 beam vectors in the candidate beam vector set back to the base station; or
   feeding, by the UE, the identifier of the beam vector with the largest metric among the N beam vectors, in the candidate beam vector set, and joint encoded information of identifiers of the other N−1 beam vectors in a set of all the beam vectors orthogonal to the beam vector with the largest metric in the candidate beam vector set back to the base station.

10. The method according to claim 1, further comprising:
    feeding, by the UE, an identifier, of a beam vector with a largest metric among the N beam vectors, in the N beam vectors back to the base station.

11. The method according to claim 1, wherein after the UE determines the combination coefficient matrix according to the basis matrix and the channel state parameter, the method further comprises:
    determining, by the UE, a pre-coding matrix according to the basis matrix and the combination coefficient matrix;
    determining, by the UE, a Channel Quality Indicator (CQI) according to the pre-coding matrix; and
    feeding, by the UE, the CQI back to the base station.

12. A method for receiving channel state information, comprising:
    receiving, by a base station, an identifier of a basis matrix, and a combination coefficient matrix, fed back by a UE, wherein the combination coefficient matrix is determined according to the basis matrix and a channel state parameter independent of the basis matrix;
    determining, by the base station, N beam vectors from a candidate beam vector set according to the identifier of the basis matrix, the N beam vectors constituting the basis matrix, and N being a positive integer; and
    determining, by the base station, a pre-coding matrix for downlink transmission with the UE according to the basis matrix and the combination coefficient matrix.

13. The method according to claim 12, wherein a value of N is prescribed, or is determined by the base station and then notified to the UE, or is determined by the UE as a result of channel measurement between the UE and the base station, and fed back to the base station.

14. The method according to claim 12, wherein receiving, by the base station, the identifier of the basis matrix fed back by the UE comprises:
    receiving, by the base station, identifiers of the N beam vectors in the candidate beam vector set, which are fed back by the UE; or
    receiving, by the base station, joint encoded information of identifiers of a part or all of the N beam vectors, which are fed back by the UE; or
    receiving, by the base station, an identifier of a beam vector group selected by the UE, and identifiers of the N beam vectors in the selected beam vector group, which are fed back by the UE, wherein the beam vector group is consisted of a part of beam vectors in the candidate beam vector set; or
    receiving, by the base station, an identifier, of a beam vector with a largest metric among the N beam vectors, in the candidate beam vector set, and identifiers of the other N−1 beam vectors in a set of all the beam vectors orthogonal to the beam vector with the largest metric in the candidate beam vector set, which are fed back by the UE; or
    receiving, by the base station, first-level identification information and second-level identification information fed back by the UE, wherein the first-level identification information is identifiers, of T beam vectors selected by the UE from the candidate beam vector set, in the candidate beam vector set, and the second-level identification information is identifiers of the N beam vectors in the T beam vectors.

15. The method according to claim 14, wherein receiving, by the base station, the joint encoded information of identifiers of a part or all of the N beam vectors, which are fed back by the UE comprises:
    receiving, by the base station, joint encoded information of identifiers of the N beam vectors in the candidate beam vector set, which are fed back by the UE; or
    receiving, by the base station, the identifier of the beam vector with the largest metric among the N beam vectors, in the candidate beam vector set, and joint encoded information of the identifiers of the other N−1 beam vectors in the candidate beam vector set, which are fed back by the UE; or
    receiving, by the base station, the identifier of the beam vector with the largest metric among the N beam vectors, in the candidate beam vector set, and joint encoded information of identifiers of the other N−1 beam vectors in a set of all the beam vectors orthogonal to the beam vector with the largest metric in the candidate beam vector set, which are fed back by the UE.

16. The method according to claim 14, wherein the method further comprises:
    receiving, by the base station, an identifier, of a beam vector with a largest metric among the N beam vectors, in the N beam vectors, which is fed back by the UE.

17. A UE, comprising a processor, a transceiver, and a memory, wherein the processor is configured to read and execute program in the memory:
    to determine a basis matrix according to a candidate beam vector set, wherein the basis matrix is a matrix of N beam vectors in the candidate beam vector set, and N is a positive integer;
    to determine a combination coefficient matrix according to the basis matrix and a channel state parameter independent of the basis matrix; and
    to feed an identifier of the basis matrix, and the combination coefficient matrix back to a base station;
    wherein the basis matrix and the combination coefficient matrix are used for determining a pre-coding matrix for downlink transmission by the base station; and
    the transceiver is configured to receive and transmit data under the control of the processor.

18. The UE according to claim 17, wherein the processor configured to read and execute program in the memory to determine the basis matrix according to the candidate beam vector set is configured to read and execute program in the memory:
    to select first N beam vectors from the candidate beam vector set in a descending order of their metrics, and to determine a matrix of the selected N beam vectors as the basis matrix; or
    to select one of L beam vector groups, wherein the L beam vector groups are obtained by grouping beam vectors in the candidate beam vector set, and L is a positive integer; and to select N beam vectors from the selected beam vector group, and to determine a matrix of the selected N beam vectors as the basis matrix; or
    to select T beam vectors from the candidate beam vector set, wherein T is more than N; and to select N beam vectors from the T beam vectors, and to determine a matrix of the selected N beam vectors as the basis matrix.

19. The UE according to claim 18, wherein the processor configured to read and execute program in the memory to select one of L beam vector groups is configured to read and execute program in the memory:
    to select a beam vector group comprising a beam vector with a largest metric from the L beam vector groups; or
    to determine a metric corresponding to each of the beam vector groups, and to select the beam vector group with a largest metric, wherein the metric corresponding to each of the beam vector groups is a value obtained by performing a preset operation on metrics of the beam vectors in the beam vector group.

20. The UE according to claim 18, wherein when the UE selects one of the L beam vector groups, and selects N beam vectors from the selected beam vector group, the processor configured to read and execute program in the memory to feed the identifier of the basis matrix back to the base station is configured to read and execute program in the memory:

to feed an identifier of the selected beam vector group, and identifiers of the N beam vectors in the selected beam vector group back to the base station.

\* \* \* \* \*